United States Patent
Ito (10) Patent No.: US 12,382,168 B2
(45) Date of Patent: Aug. 5, 2025

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Yasushi Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 239 days.

(21) Appl. No.: 18/188,579

(22) Filed: Mar. 23, 2023

(65) Prior Publication Data
US 2023/0345119 A1  Oct. 26, 2023

(30) Foreign Application Priority Data
Apr. 21, 2022  (JP) ................... 2022-070270

(51) Int. Cl.
*H04N 23/66* (2023.01)
*H04N 23/60* (2023.01)
*H04N 23/63* (2023.01)

(52) U.S. Cl.
CPC ......... *H04N 23/665* (2023.01); *H04N 23/633* (2023.01)

(58) Field of Classification Search
CPC ............... H04N 23/664; H04N 23/633
See application file for complete search history.

(56) References Cited

U.S. PATENT DOCUMENTS

| 10,924,663 | B2 | 2/2021 | Ito |
| 11,496,683 | B2 | 11/2022 | Ito |
| 2020/0358949 | A1* | 11/2020 | Omori ............... H04N 23/73 |
| 2021/0195098 | A1 | 6/2021 | Ito |

FOREIGN PATENT DOCUMENTS

| JP | 2021-019347 A | 2/2012 |
| JP | 2020-113918 A | 7/2020 |
| JP | 2021-097364 A | 6/2021 |
| JP | 2021-141420 A | 9/2021 |

* cited by examiner

*Primary Examiner* — Lin Ye
*Assistant Examiner* — Fayez A Bhuiyan
(74) *Attorney, Agent, or Firm* — Cowan, Liebowitz & Latman, P.C.

(57) ABSTRACT

An image capturing apparatus that captures an image for recording while displaying a live view image includes a first timing generation unit configured to generate a readout timing of an imaging element, a second timing generation unit configured to generate a system timing of the image capturing apparatus and an update timing for displaying an image, a synchronization signal generation unit configured to generate a synchronization signal for a display device based upon the update timing, a difference detection unit configured to detect, at a predetermined timing, a difference between the readout timing and the system timing, and a control unit configured to delay the update timing from the system timing in accordance with the difference to synchronize the readout timing and the update timing.

14 Claims, 6 Drawing Sheets

IMAGE CAPTURING APPARATUS, CONTROL METHOD THEREOF, AND STORAGE MEDIUM

BACKGROUND OF THE INVENTION

Field of the Invention

The present invention relates to an image capturing apparatus and a control method thereof.

Description of the Related Art

In recent years, mirrorless-type cameras have become more widespread in addition to compact-type digital cameras, and there has been an increase in the number of cameras provided with a display panel or an electronic view finder (hereinafter, EVF) mounted at the rear surface of the camera as a display member used to check a target of imaging. A function for checking a target of imaging conventionally realized by an optical viewfinder (OVF) is now assigned to a live view (hereinafter, notated as LV) image displayed on a display panel or EVF at a rear surface.

The LV image is realized by displaying image data obtained from an imaging element provided in an image capturing apparatus on a display panel or EVF at the rear surface. In a case where one imaging element is provided in the image capturing apparatus, the imaging element needs to perform both output of image data for still image recording and output of the image data for the LV display. In this case, reading out for the LV display needs to be performed while reading out a still image, which complicates control thereof. A known process has been performed that makes a display black or the like while the imaging element is reading out the image data for still image recording.

In Japanese Patent Laid-Open No. 2021-19347, an exposure time for capturing one still image is divided. A plurality of still images overlaid into one still image are acquired, while at the same time, one or more of the plurality of still images are sequentially used as an LV image to perform LV display during a period in which the LV image cannot be captured.

In the conventional technology described above, however, since the image data for LV display continues to be displayed at constant intervals regardless of whether image capturing is being performed, the readout timing of the imaging element needs to be matched with the timing of the LV display during image capturing. Thus, there is the problem that the time from starting image capturing for reading out performed by the imaging element varies per image capturing iteration, making it impossible to guarantee consistent shutter time lag.

SUMMARY OF THE INVENTION

The present invention has been made in view of the problem described above, and provides an image capturing apparatus that makes it possible to reduce variation in shutter time lag in a case where images are captured while LV display is being performed.

According to a first aspect of the present invention, there is provided an image capturing apparatus that captures an image for recording while displaying a live view image, the image capturing apparatus comprising: at least one processor or circuit configured to function as: a first timing generation unit configured to generate a readout timing of an imaging element; a second timing generation unit configured to generate a system timing of the image capturing apparatus and an update timing for displaying an image; a synchronization signal generation unit configured to generate a synchronization signal for a display device based upon the update timing; a difference detection unit configured to detect, at a predetermined timing, a difference between the readout timing and the system timing; and a control unit configured to delay the update timing from the system timing in accordance with the difference to synchronize the readout timing and the update timing.

According to a second aspect of the present invention, there is provided a method of controlling an image capturing apparatus that captures an image for recording while displaying a live view image, the method comprising: performing first timing generation in which a readout timing of an imaging element is generated; performing second timing generation in which a system timing of the image capturing apparatus and an update timing for displaying an image are generated; performing synchronization signal generation in which a synchronization signal for a display device is generated based upon the update timing; performing difference detection in which a difference between the readout timing and the system timing is detected at a predetermined timing; and performing control in which the update timing is delayed from the system timing in accordance with the difference to synchronize the readout timing and the update timing.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
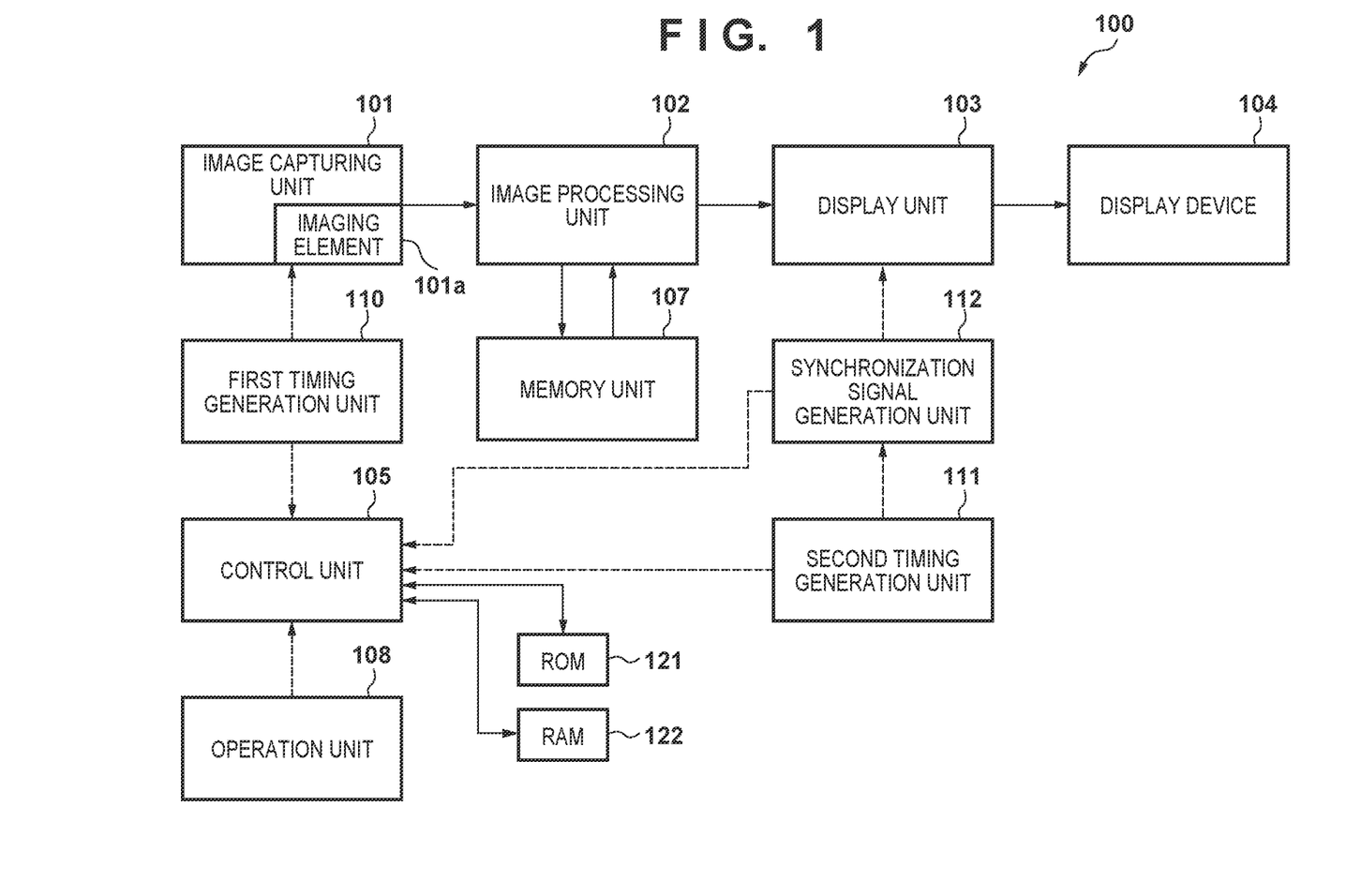
FIG. 1 is a block diagram illustrating a configuration of an image capturing apparatus according to a first embodiment of the present invention.

FIG. 1 is a block diagram illustrating a configuration of an image capturing apparatus according to a first embodiment of the present invention.

In FIG. 1, an image capturing apparatus 100 includes an image capturing unit 101, an image processing unit 102, a display unit 103, a display device 104, a control unit 105, a memory unit 107, an operation unit 108, a first timing generation unit 110, a second timing generation unit 111, and a synchronization signal generation unit 112. A ROM 121 and a RAM 122 are connected to the control unit 105, the ROM 121 storing a control program to be executed by the control unit 105 to control the entire image capturing apparatus 100, and the RAM 122 being used as a work area or the like for the control unit 105 to execute the program.

The image capturing apparatus 100 also includes a compression and decompression unit (not illustrated) that compresses image data or decompresses compressed data, an external recording unit (not illustrated) that records the compressed data on an external medium, or the like. The image capturing apparatus 100 has a function of capturing a live view image and performing live view display. Below, the live view is also notated as LV. Note that the first timing control unit 110 generates a timing signal for reading out a signal from an imaging element 101a, and the second timing control unit 111 generates a timing signal for the live view display.

The image capturing unit 101 includes the imaging element 101a having a CCD, a CMOS sensor, or the like that converts a received target image into an electric signal to create image data. The image capturing unit 101 also includes an AD converter that converts an analog image signal obtained from the imaging element 101a to a digital signal to output the digital signal as image data. The image data outputted from the image capturing unit 101 is written on the memory unit 107 via the image processing unit 102.

The image processing unit 102 performs a plurality of processes such as shading correction, defective pixel correction, white balance adjustment, and gamma correction. The image processing unit 102 uses one or more of the plurality of processes to perform the appropriate image processing on the image data. The image processing unit 102 writes a processing result of the image processing to the memory unit 107.

The display unit 103 controls display of the display device 104. The display unit 103 acquires the image data processed at the image processing unit 102 from the memory unit 107 via the image processing unit 102. Necessary processing is then performed on the image data to generate a display image, and the display image is superimposed on a synchronization signal received from the synchronization signal generation unit 112, which will be described below, to forward the display image to the display device 104.

The display unit 103 performs, for example, luminance and color adjustment, resizing processing for adjusting the display image to match the size of the display device 104, a process of superimposing an on-screen display (OSD) image, and format conversion processing in accordance with the display device 104.

The display device 104 includes, for example, a liquid crystal display (LCD), an organic EL display (OLED), and displays an image sent from the display unit 103. The display device 104 includes, for example, a display panel at a rear surface of a digital camera or an electronic viewfinder (EVF). LV display is performed on the display panel or the electronic viewfinder.

The control unit 105 includes one or a plurality of processors that are in charge of operation control of the image capturing apparatus 100, and performs various types of control and processing in accordance with a user's operation through the operation unit 108 that will be described below. For example, the control unit 105 controls the image capturing unit 101, the image processing unit 102, the display unit 103, the first timing generation unit 110, the second timing generation unit 111, and the synchronization signal generation unit 112. The control unit 105 also has a difference detection function of detecting a time difference of a timing output signal between the first timing generation unit 110 and the second timing generation unit 111.

The memory unit 107 has sufficient memory capacity to store data such as a predetermined number of still images, motion images for a predetermined period of time, and sound data. The memory unit 107 includes, for example, DRAM. Note that the memory unit 107 may include a plurality of memories.

The operation unit 108 is used by the user to input, into the control unit 105, a shutter operation or operation of various parameters of the image capturing apparatus 100. The parameters of the image capturing apparatus 100 include, for example, an ISO-sensitivity setting value, a shutter speed setting value, or the like.

The first timing generation unit 110 generates a timing for starting to read out the image signal from the imaging element 101a. The first timing generation unit 110 operates in response to an instruction from the control unit 105 and, for example, outputs a one-off timing signal in tandem with pressing a shutter button during still image capturing. In a case of continuous image capturing, the first timing generation unit 110 continues to output timing signals at constant intervals in accordance with the specifications of the image capturing apparatus 100 when the shutter button is being pressed. During LV display, the first timing generation unit 110 continues to output timing signals at constant intervals specified in standard specifications such as the Society of Motion Picture and Television Engineers (SMPTE).

The second timing generation unit 111 generates an image update timing of the display device 104 and outputs the image update timing to the synchronization signal generation unit 112. For example, the image update timing is compliant with standard specifications such as the SMPTE. The second timing generation unit 111 also outputs, to the control unit 105, a timing signal used for reflecting the parameter settings or the like of the image capturing apparatus 100. This signal is normally the same timing signal as the signal outputted to the synchronization signal generation unit 112.

The synchronization signal generation unit 112 generates a synchronization signal for the display device 104, and transmits the synchronization signal to the display unit 103. The synchronization signal includes, for example, a vertical synchronization signal (vblank, vsync) or a horizontal synchronization signal (hblank, hsync). The synchronization signal generation unit 112 needs to operate at the same timing as the second timing generation unit 111 that generates the timing compliant with standard specifications, and has therefore a synchronization relationship with the second timing generation unit 111. However, it is necessary to output signals that are dependent on a display format or a display device, and hence, the synchronization signal generation unit 112 operates with a clock different from the second timing generation unit 111. Thus, the second timing generation unit 111 and the synchronization signal generation unit 112 exist as separate blocks.

Figure 2:
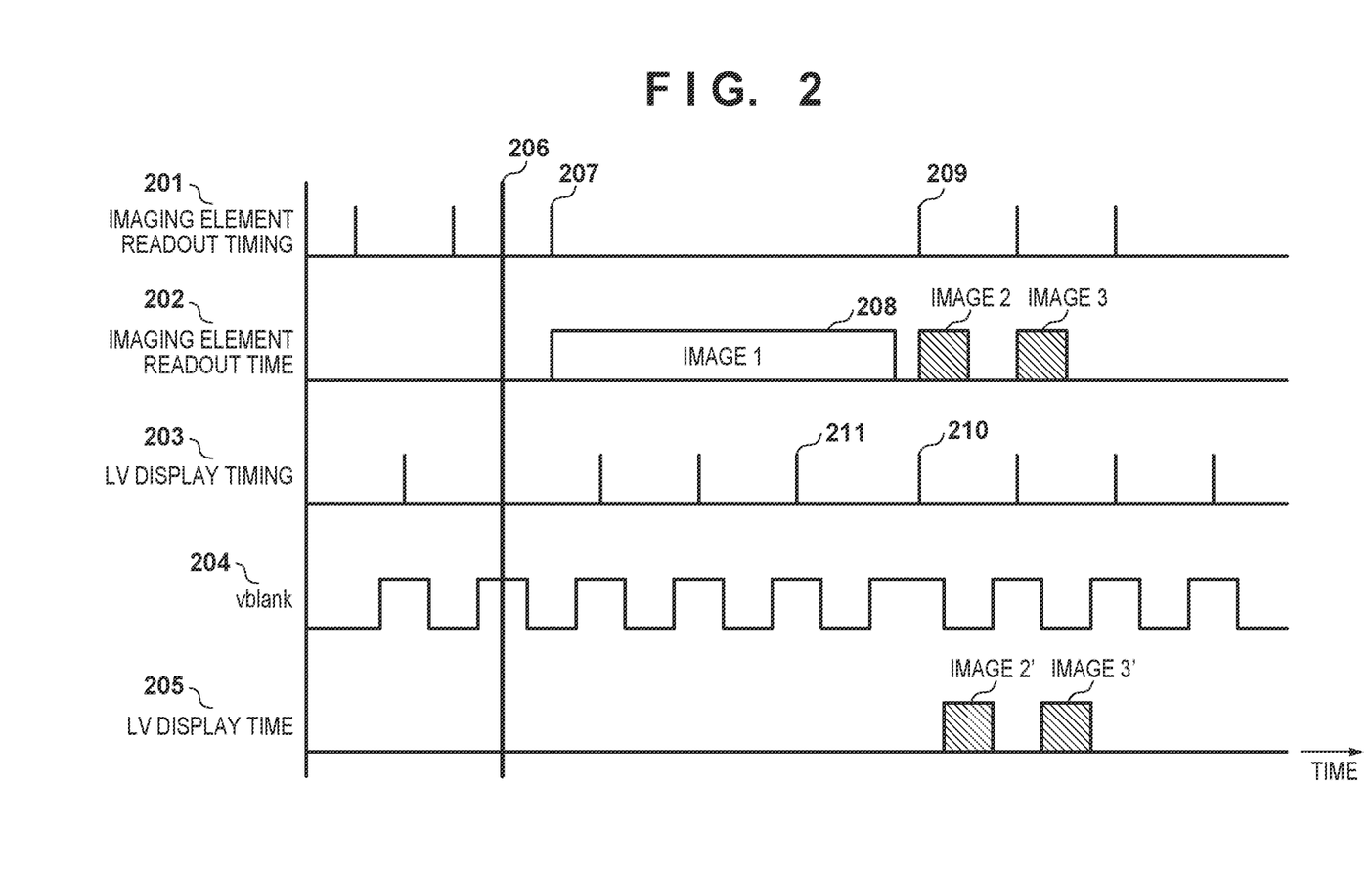
FIG. 2 is a timing chart illustrating imaging processing.

FIG. 2 illustrates an example of a timing chart showing a readout timing of the imaging element 101a and an LV display timing. An imaging element readout timing 201 is outputted from the first timing generation unit 110 and indicates the timing for starting to read out the image signal from the imaging element 101a that belongs to the image capturing unit 101. An imaging element readout time 202 indicates a period of time during which an image is read out from the imaging element 101a.

An LV display timing 203 is a signal outputted from the second timing generation unit 111 to the synchronization signal generation unit 112 and indicates an update timing of LV display. A vblank 204 is a portion of a signal outputted from the synchronization signal generation unit 112 to the display unit 103 and indicates a vblank signal. An LV display time 205 indicates a time during which LV display is performed on the display device 104.

When the shutter button is pressed at a clock time 206, reading out an image 1 from the imaging element starts at a clock time 207. By using a clock time 208 as a trigger at which reading out of the image 1 completes, reading out an image 2 for the LV image starts at a next imaging element readout clock time 209. At an LV display updated time 210 synchronized (this synchronization will be described below) with the imaging element readout clock time 209, displaying an image 2' on the display device 104 starts. Note that the readout time of the imaging element 101a, in other words, a period of time from the clock time 207 to the clock time 208 is a value determined through an image capturing condition such as an exposure time, and the clock time 208 at which reading out of the image 1 completes can be determined at the readout starting clock time 207 of the image 1.

A method of synchronizing the LV display timing with the imaging element readout timing will be described with reference to FIG. 3.

As described above, the imaging element readout timing 201 is outputted from the first timing generation unit 110. A counter 302 indicates a transition of count values of a counter circuit for generating a system timing 303 and the LV display timing 203. The system timing 303 is a signal outputted from the second timing generation unit 111 to the control unit 105.

The LV display timing 203 is a signal outputted from the second timing generation unit 111 to the synchronization signal generation unit 112. A counter 305 indicates a transition of count values of a counter circuit for generating a synchronization signal generation timing 306 and the vblank 204.

The synchronization signal generation timing 306 is a signal outputted from the synchronization signal generation unit 112 to the control unit 105. The vblank 204 is a signal outputted from the synchronization signal generation unit 112 to the display unit 103.

The counter 302 and the counter 305 each operate in a countdown manner. An initial value a and an initial value b of the counters each correspond to the interval at which timing is caused to occur, in other words, correspond to the total pixel count of one image. The count value is loaded with the initial value of the counter being "0", and at the same time, various types of timing are outputted.

The vblank 204 is a portion of the synchronization signal to the display device 104 and is generated by referring to the count value of the counter 305. Specifically, a count value n and a count value m of the counter 305 are set, the count value n and the count value m respectively corresponding to a rising edge and a falling edge of a waveform of the vblank 204. The LV display timing 203 normally has a synchronization relationship with the synchronization signal generation timing 306. Specifically, with the output of the timing signal of the LV display timing 203, the initial value b of the count value of the counter 305 is loaded to align timing.

Assuming that a time difference, detected by the control unit 105, between the LV display timing 203 and the imaging element readout timing 201 is "d", processing up until the synchronization processing at clock time 308 will be described in reverse chronological order. Note that various types of settings are performed at timings provided by the synchronization signal generation timing 306, which are reflected on a circuit at a next synchronization signal generation timing that has been set.

At the clock time 309, a value corresponding to a delay amount d is set for the LV display timing 203. Specifically, a value obtained by subtracting, from the initial value a of the counter 302 is set, a count value d' corresponding to the delay amount d from the initial value a of the counter 302 is set. With this process, a timing signal is outputted to the counter 305 at a clock time at which a count value of the counter 302 turns into a-d' in other words, at the timing 211, and the initial value b of the counter 305 is loaded at this timing.

The system timing 303 and the LV display timing 203 refer to the value of the count value 302 to output individual timings. However, the timing of the system timing 303 remains unchanged and only the LV display timing 203 is synchronized with the imaging element readout timing 201.

The synchronization signal generation timing 306 and the vblank 204 are always in a synchronization relationship with the LV display timing 203, and follow the LV display timing 211 without changing the initial value of the counter 305 and the rising edge setting and the falling edge setting of the vblank.

In other words, a clock time 312 of the imaging element readout timing and a clock time 310 of the synchronization signal generation timing coincide with each other, and synchronization is executed at approximately 1V from the first set clock time 309 to the clock time 308 at which synchronization is executed (synchronization processing time).

As described above, the synchronization start time is determined at the readout starting clock time 207 of the image 1 to start the synchronization processing at the clock time 211 while reading out the image 1 from the imaging element. Thus, the clock time 210 for LV display follows the imaging element readout clock time 209, and synchronization is performed.

In this manner, during imaging, the timing for LV display is synchronized with the readout timing rather than synchronizing the timing for LV display with the readout timing of the imaging element. This makes it possible to reduce shutter time lag per image capturing iteration.

Second Embodiment

Figure 3:
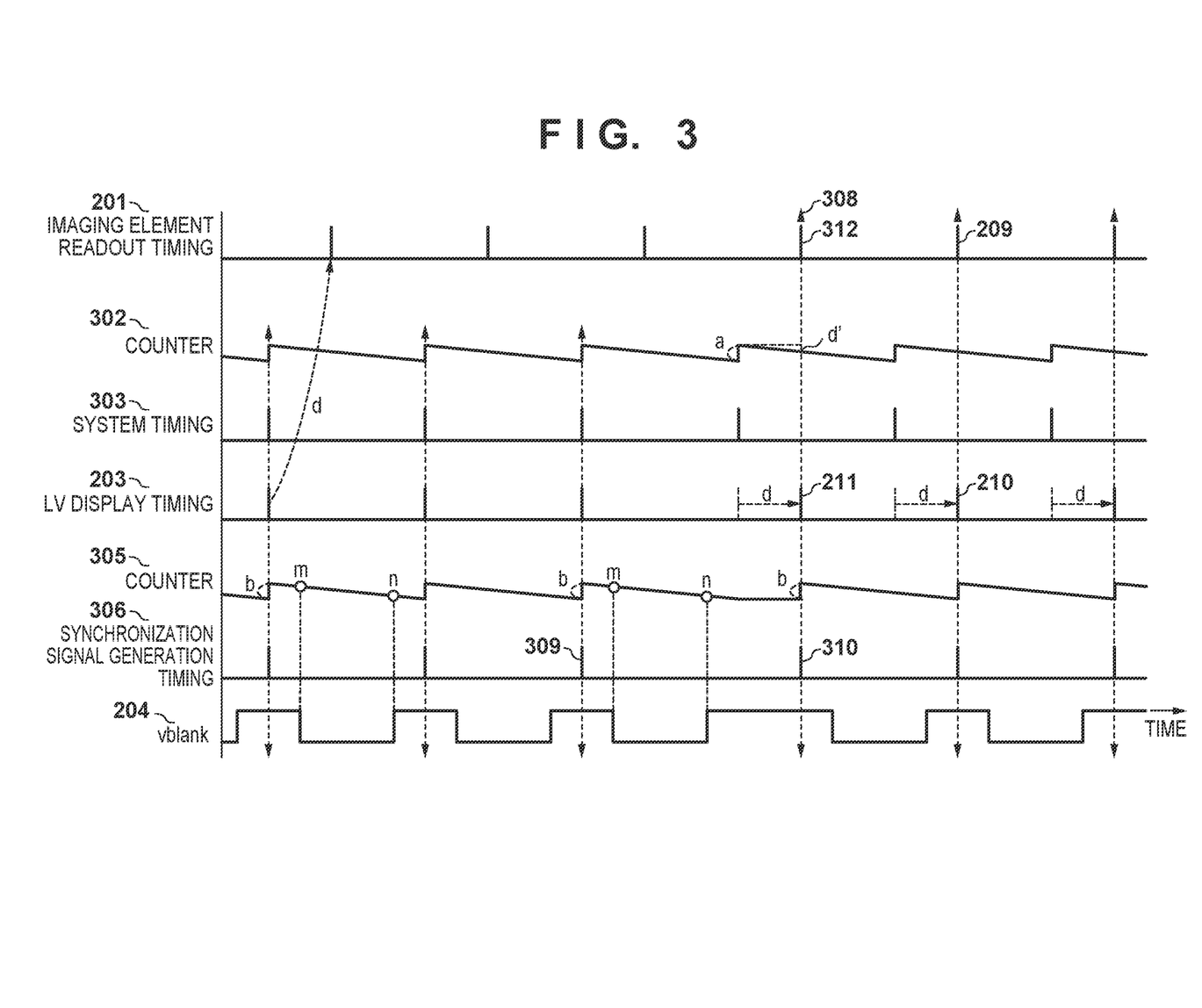
FIG. 3 is a timing chart illustrating synchronization processing in the first embodiment.

In the synchronization method illustrated in FIG. 3 of the first embodiment, it takes a period of approximately 1V to perform the synchronization processing.

Figure 4:
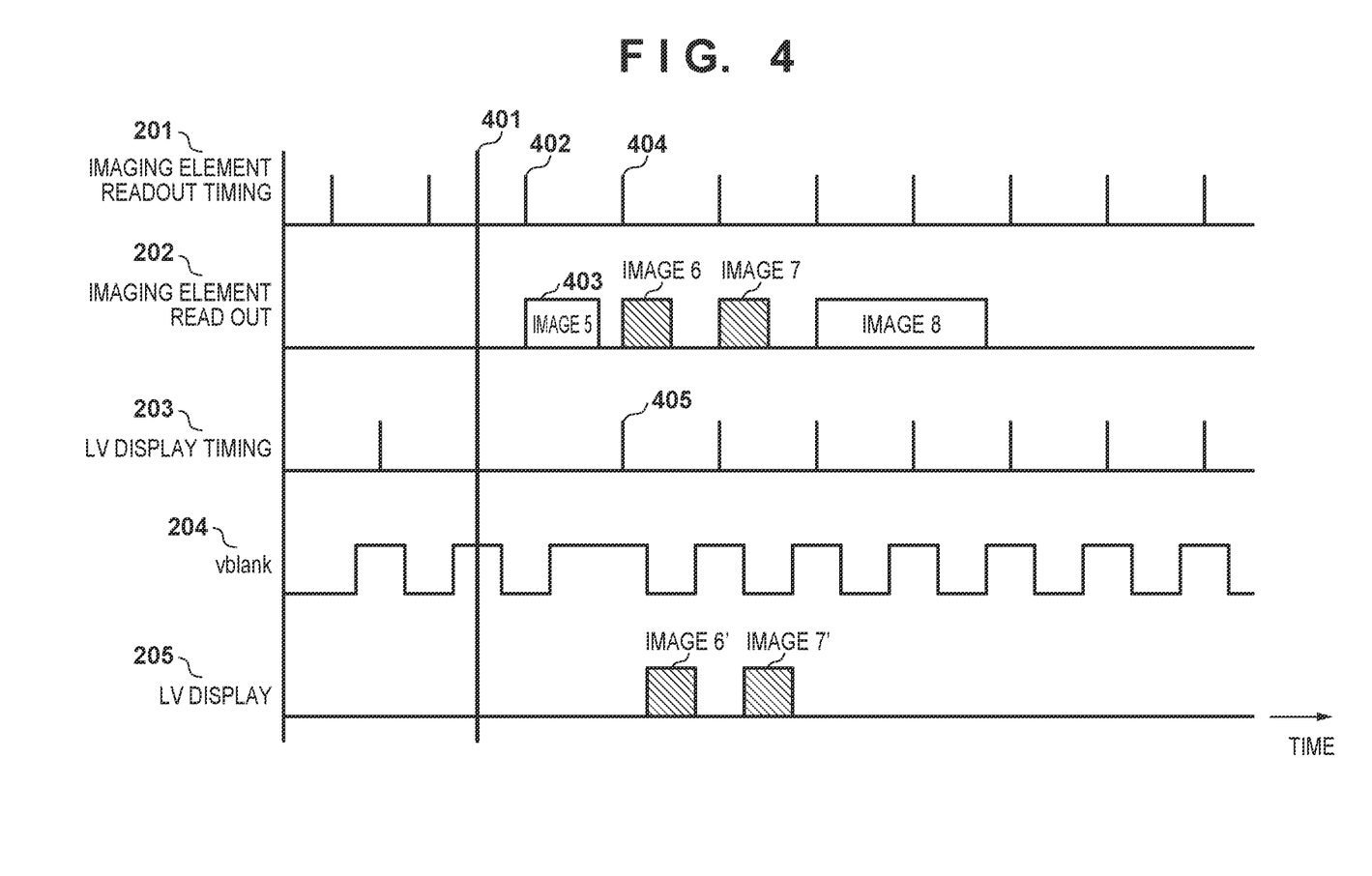
FIG. 4 is a timing chart illustrating continuous capturing processing.

FIG. 4 illustrates an example of a timing chart in a case where the readout time for still image capturing is short as is the case for an image 5. The legend to the timing chart are similar to FIG. 2.

When the shutter button is pressed at a clock time 401, reading out the image 5 from the imaging element starts at a clock time 402. By using, as a trigger, a timing 403 when reading out of the image 5 completes, reading out an image 6 being an LV image starts at a next still image readout timing 404. Displaying an image 6' on the display device 104 starts at an LV display timing 405 that is synchronized with the still image readout timing 404.

Here, the readout time for capturing a still image is below 1V. In addition, when a period of approximately 1V necessary for the synchronization processing is tracked back from an updated time 405 for LV display, the timing for starting the synchronization processing is on and before the timing 402 for starting to read out the image 5. This means that the synchronization processing does not make it in time.

In the second embodiment, a method of decreasing shutter time lag in consideration of a case where the readout time for still image capturing is short when the synchronization method illustrated in FIG. 3 is applied to continuous capturing.

Figure 5:
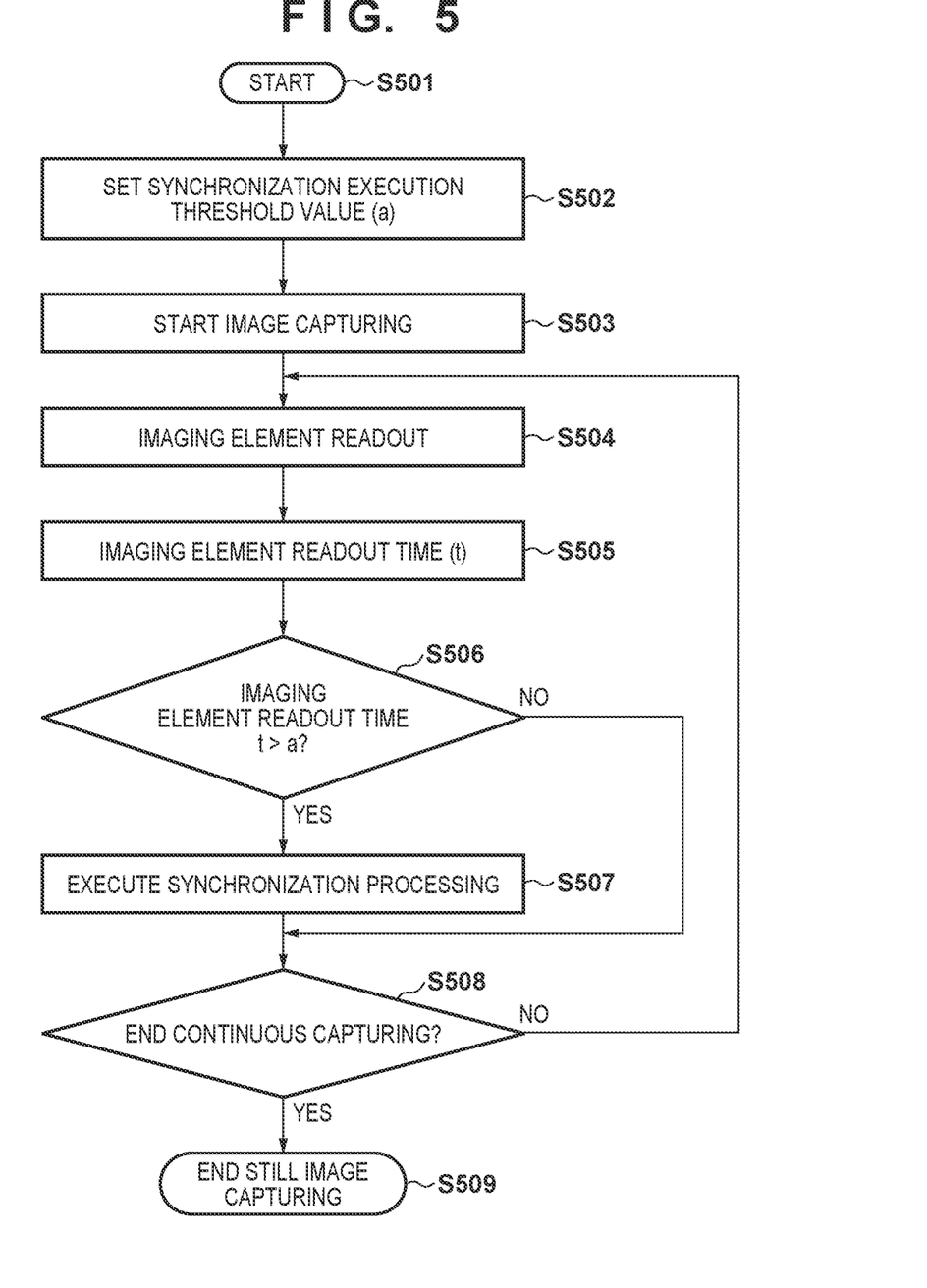
FIG. 5 is a flowchart illustrating an operation of an image capturing apparatus in a second embodiment.

FIG. 5 is a flow chart showing an operation of continuous capturing according to the present embodiment. The operation in the flow chart of FIG. 5 is implemented by loading, by the control unit 105, a control program into the RAM 122 to execute the control program, the control program being stored in the ROM 121. Note that the configuration of the image capturing apparatus according to the present embodiment is similar to that in the first embodiment.

First, the present starts in step S501.

In step S502, the control unit 105 sets a threshold value a for determining whether the synchronization processing is performed. The control unit 105 actually sets a time required to perform synchronization, and a value corresponding to "1V" in the present embodiment.

In step S503, the control unit 105 starts continuous capturing in response to an instruction to start image capturing through the user pressing a shutter button or the like.

In step S504, the control unit 105 starts reading out the image signal from the imaging element 101*a*.

As described above, it is possible to determine the readout time of the imaging element at the timing at which reading out from the imaging element 101*a* starts. Thus, in step S505, the control unit 105 determines a readout time t of a signal from the imaging element 101*a*.

In step S506, the control unit 105 compares the threshold value a set in step S502 with the readout time t of the imaging element 101*a* determined in step S505. In a case of "t>a", the control unit 105 moves the process to step S507, and starts the synchronization processing at the timing tracked back by a time a required to perform the synchronization from the timing at which synchronization is performed. In a case of "t≥a", the control unit 105 does not perform the synchronization processing and moves the process to step S508.

In step S508, the control unit 105 determines whether there is any instruction to end the continuous capturing due to the user no longer pressing the shutter button or the like. In a case where the continuous capturing does not end, the control unit 105 returns the process to step S504. In a case where the continuous capturing ends, the operation of the present flow ends in step S509.

As described above, the second embodiment makes it possible to determine a time required to read out a signal from the imaging element, and to also determine whether to perform the synchronization processing based upon the length of the readout time for a signal from the imaging element. This makes it possible to reduce shutter time lag per image capturing iteration.

Third Embodiment

The speed of the continuous capturing of image capturing apparatuses increases year by year, while conventional continuous capturing at comparatively slow speeds is still required. In recent years, the increasing number of image capturing apparatuses allows users to select the speed of continuous capturing. With the synchronization method illustrated in FIG. 3 of the first embodiment, visual perceptibility of the LV display improves while, due to human visual characteristics, shutter time lag is less likely to be recognized as the capturing interval of the continuous capturing decrease. In light of this fact, in the third embodiment, a method of changing the synchronization method described in FIG. 3 in accordance with the speed of continuous capturing will be described.

Figure 6:
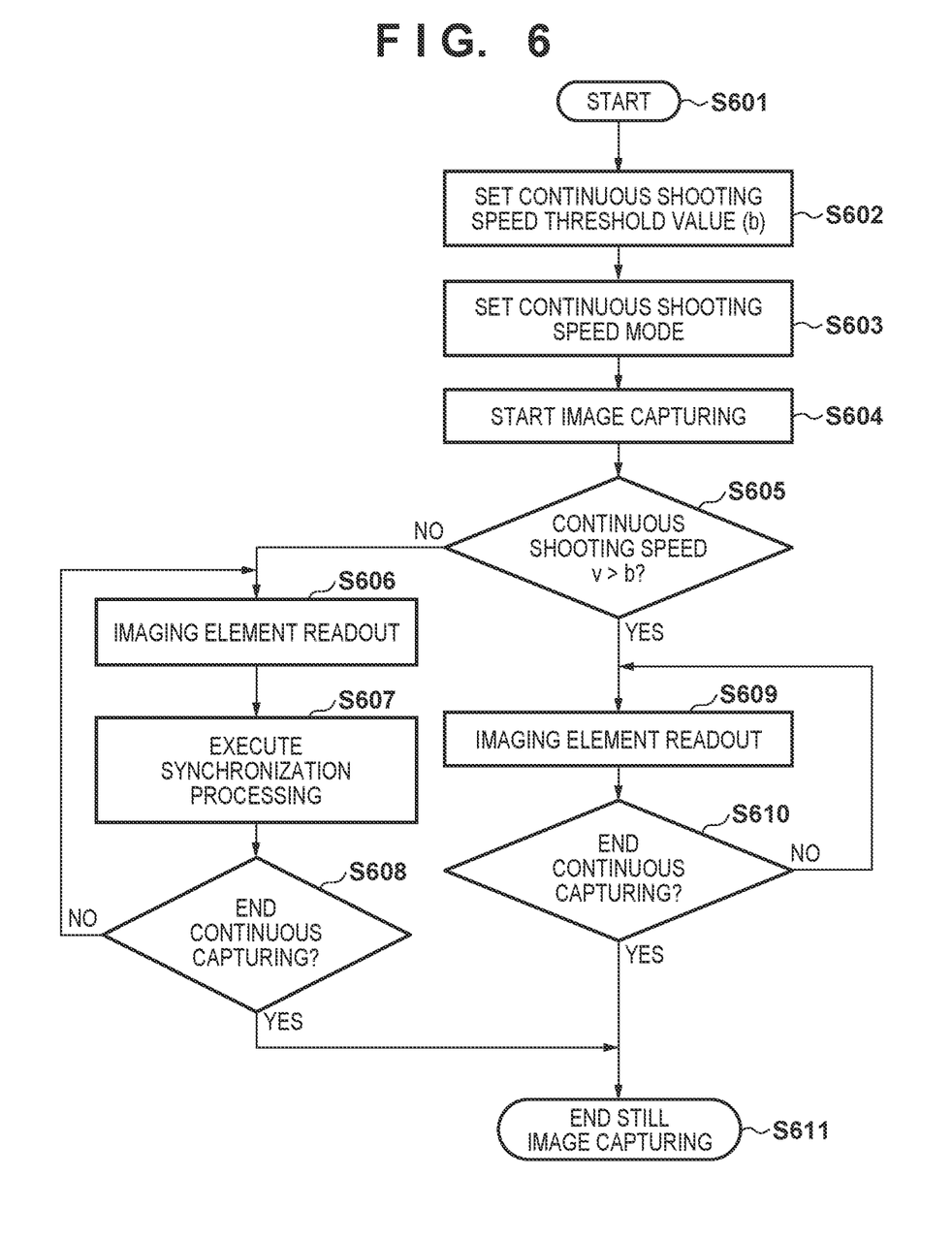
FIG. 6 is a flowchart illustrating an operation of an image capturing apparatus in a third embodiment.

FIG. 6 is a flowchart showing an operation of the continuous capturing in the third embodiment. The operation in the flowchart in FIG. 6 is implemented by loading, by the control unit 105 a control program into the RAM 122 to execute the control program, the control program being stored in the ROM 121. Note that the configuration of the image capturing apparatus according to the present embodiment is similar to that in the first embodiment.

First, in step S601, the present flow starts.

In step S602, the control unit 105 sets a threshold value b used to determine whether to perform the synchronization processing. The control unit 105 actually sets the speed of continuous capturing, and for example, a value corresponding to the number of capturing frames per second.

In step S603, the control unit 105 selects a speed v of the continuous capturing based upon a user operation. In the present embodiment, the speed of the continuous capturing is described as having two states, "faster" and "slower" than the threshold value b set in step S602, but more than two states may be used.

In step S604, the control unit 105 starts the continuous capturing in response to an instruction to start image capturing through the user pressing a shutter button or the like.

In step S605, the control unit 105 compares the speed v of the continuous capturing with the threshold value b set in step S602. In a case of "v≤b," the control unit 105 moves the process to step S606, and in a case of "v>b," the control unit 105 moves the process to step S609.

In step S606, the control unit 105 starts reading out the image signal from the imaging element 101*a*.

In step S607, the control unit 105 starts the synchronization processing at the timing tracked back by a time required to perform the synchronization from the timing at which synchronization is performed.

In step S608, the control unit 105 determines whether there is any instruction to end the continuous capturing due to the user no longer pressing the shutter button or the like. In a case where the continuous capturing does not end, the control unit 105 returns the process to step S606. In a case where the continuous capturing ends, the operation of the present flow ends in step S611.

In step S609, the control unit 105 starts reading out the image signal from the imaging element 101*a*.

In step S610, the control unit 105 determines whether there is any instruction to end the continuous capturing due to the user no longer pressing the shutter button or the like. In a case where the continuous capturing does not end, the control unit 105 returns the process to step S609. In a case where the continuous capturing ends, the operation of the present flow ends in step S611.

As described above, the third embodiment makes it possible to determine whether to perform the synchronization processing based upon the image capturing speed of the continuous capturing. Note that, when determining the imagine capturing speed for the continuous capturing, it may be possible to refer to, for example, each status of the image capturing apparatus such as the remaining capacity of a buffer during the continuous capturing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070270, filed Apr. 21, 2022, which is hereby incorporated by reference herein in its entirety.

What is claimed is:

1. An image capturing apparatus that captures an image for recording while displaying a live view image, the image capturing apparatus comprising:
   at least one processor or circuit configured to function as:
   a first timing generation unit configured to generate a readout timing of an imaging element;
   a second timing generation unit configured to generate a system timing of the image capturing apparatus and an update timing for displaying an image;
   a synchronization signal generation unit configured to generate a synchronization signal for a display device based upon the update timing;
   a difference detection unit configured to detect, at a predetermined timing, a difference between the readout timing and the system timing; and
   a control unit configured to delay the update timing from the system timing in accordance with the difference to synchronize the readout timing and the update timing.

2. The image capturing apparatus according to claim 1, wherein
   the second timing generation unit and the synchronization signal generation unit operate with different clocks.

3. The image capturing apparatus according to claim 1, wherein
   the second timing generation unit includes a counter.

4. The image capturing apparatus according to claim 2, wherein
   the update timing is delayed based upon a value of a counter of the second timing generation unit.

5. The image capturing apparatus according to claim 1, wherein
   the synchronization signal generation unit includes a counter.

6. The image capturing apparatus according to claim 1, wherein
   the second timing generation unit is configured to generate a signal with an identical timing as the synchronization signal generation unit.

7. The image capturing apparatus according to claim 1, wherein
   the synchronization signal generation unit outputs a vertical synchronization signal and a horizontal synchronization signal.

8. The image capturing apparatus according to claim 1, wherein
   the control unit determines whether to synchronize the readout timing and the update timing with each other based upon an image capturing condition of the image capturing apparatus.

9. The image capturing apparatus according to claim 8, wherein
   in a case where a readout time of a signal from the imaging element based on the image capturing condition of the image capturing apparatus is longer than a processing time for the synchronization, the control unit performs the synchronization.

10. The image capturing apparatus according to claim 1, wherein
    the predetermined timing is a timing at which capturing the image for recording is instructed.

11. The image capturing apparatus according to claim 1, wherein
    in a case where an imaging interval for continuous capturing is longer than a predetermined interval, the control unit performs the synchronization.

12. A method of controlling an image capturing apparatus that captures an image for recording while displaying a live view image, the method comprising:
    performing first timing generation in which a readout timing of an imaging element is generated;
    performing second timing generation in which a system timing of the image capturing apparatus and an update timing for displaying an image are generated;
    performing synchronization signal generation in which a synchronization signal for a display device is generated based upon the update timing;
    performing difference detection in which a difference between the readout timing and the system timing is detected at a predetermined timing; and
    performing control in which the update timing is delayed from the system timing in accordance with the difference to synchronize the readout timing and the update timing.

13. A non-transitory computer-readable storage medium that stores a program for causing a computer to execute each step of a method of controlling an image capturing apparatus that captures an image for recording while displaying a live view image, the method comprising:

performing first timing generation in which a readout timing of an imaging element is generated;

performing second timing generation in which a system timing of the image capturing apparatus and an update timing for displaying an image are generated;

performing synchronization signal generation in which a synchronization signal for a display device is generated based upon the update timing;

performing difference detection in which a difference between the readout timing and the system timing is detected at a predetermined timing is detected; and performing control in which the update timing is delayed from the system timing in accordance with the difference to synchronize the readout timing and the update timing.

14. The image capturing apparatus according to claim 1, wherein the control unit adjusts the update timing from the system timing in accordance with the difference to prioritize the timing of still image capture and reduce variations in shutter time lag.

* * * * *